United States Patent
Bi et al.

(10) Patent No.: US 9,137,795 B2
(45) Date of Patent: Sep. 15, 2015

(54) METHOD AND SYSTEM FOR ALLOCATING RESOURCES OF RELAY LINK-PHYSICAL DOWNLINK CONTROL CHANNEL

(75) Inventors: Feng Bi, Shenzhen (CN); Ming Yuan, Shenzhen (CN); Feng Liang, Shenzhen (CN); Jin Yang, Shenzhen (CN); Shuanshuan Wu, Shenzhen (CN); Bo Dai, Shenzhen (CN); Yifei Yuan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 327 days.

(21) Appl. No.: 13/642,672

(22) PCT Filed: Jun. 10, 2011

(86) PCT No.: PCT/CN2011/075603
§ 371 (c)(1),
(2), (4) Date: Oct. 22, 2012

(87) PCT Pub. No.: WO2011/153964
PCT Pub. Date: Dec. 15, 2011

(65) Prior Publication Data
US 2013/0039261 A1     Feb. 14, 2013

(30) Foreign Application Priority Data

Jun. 12, 2010   (CN) .......................... 2010 1 0206654

(51) Int. Cl.
*H04B 7/14*     (2006.01)
*H04W 72/04*    (2009.01)
(Continued)

(52) U.S. Cl.
CPC ......... *H04W 72/0426* (2013.01); *H04L 5/0053* (2013.01); *H04W 72/0453* (2013.01); *H04W 84/047* (2013.01)

(58) Field of Classification Search
CPC .......................... H04L 5/0053; H04W 72/042
USPC ........................................................ 370/315
See application file for complete search history.

(56) References Cited

U.S. PATENT DOCUMENTS

2010/0167743 A1*  7/2010  Palanki et al. ............... 455/436
2011/0038303 A1*  2/2011  Ji et al. ........................ 370/315
(Continued)

FOREIGN PATENT DOCUMENTS

| CN | 101527961 A | 9/2009 |
|----|----|----|
| CN | 102036262 A | 4/2011 |
| WO | 2009109079 A1 | 9/2009 |

OTHER PUBLICATIONS

International Search Report in international application No. PCT/CN2011/075603, mailed on Sep. 29, 2011.
English Translation of the Written Opinion of the International Search Authority in international application No. PCT/CN2011/075603, mailed on Sep. 29, 2011.
(Continued)

*Primary Examiner* — Mark Rinehart
*Assistant Examiner* — Matthew Hopkins
(74) *Attorney, Agent, or Firm* — Oppedahl Patent Law Firm LLC

(57) ABSTRACT

The disclosure provides a method and system for allocating resources of a Relay link-Physical Downlink Control Channel (R-PDCCH). The method includes that: a network side configures a resource allocation way of the R-PDCCH (400); a relay node receives control information carried in the R-PDCCH in accordance with the configured resource allocation way (401). The disclosure provides a specific solution for implementing the resource allocation of the R-PDCCH.

8 Claims, 3 Drawing Sheets

```
                                                    400
┌─────────────────────────────────────────────────┐
│  A network side configures a resource allocation │
│             way of the R-PDCCH                   │
└─────────────────────────────────────────────────┘
                        │
                        ▼                          401
┌─────────────────────────────────────────────────┐
│ A relay node receives control information carried│
│   in the R-PDCCH in accordance with the          │
│         configured resource allocation way       │
└─────────────────────────────────────────────────┘
```

(51) Int. Cl.
*H04L 5/00* (2006.01)
*H04W 84/04* (2009.01)

(56) References Cited

U.S. PATENT DOCUMENTS

2011/0051654 A1* 3/2011 Blankenship et al. ........ 370/315
2011/0103292 A1* 5/2011 Pasad et al. .................. 370/315
2011/0103295 A1* 5/2011 Khandekar et al. ........... 370/315

OTHER PUBLICATIONS

3GPP. Supporting frequency diversity and frequency selective R-PDCCH transmissions. (R1-101320) TSG-RAN WG1#60, Feb. 16, 2010.
3GPP. Control signaling placement design for relay nodes. (R1-094517) TSG-RAN WG1#59, Nov. 13, 2009.
Catt, "Design of Backhaul Control Channel for Type I Relay in LTE-A," 3GPP TSG RAN WG1 #57, R1-091990, May 8, 2009. (5 pages—see entire document).

* cited by examiner

METHOD AND SYSTEM FOR ALLOCATING RESOURCES OF RELAY LINK-PHYSICAL DOWNLINK CONTROL CHANNEL

TECHNICAL FIELD

The disclosure relates to resource allocation technologies, and in particular to a method and system for allocating resources of a Relay link-Physical Downlink Control Channel (R-PDCCH).

BACKGROUND

A Long Term Evolution (LTE) system, a Long Term Evolution Advanced (LTE-A) system and an International Mobile Telecommunication Advanced (IMT-Advanced) system are all based on an Orthogonal Frequency Division Multiplexing (OFDM) technique.

In an OFDM system, data mainly exists in the form of time-frequency; in the LTE and LTE-A, a Resource Block (RB), which is called a Physical Resource Block (PRB) when mapped to physical resource, is defined as continuous OFDM symbols in a slot in time domain, and 12 or 24 continuous subcarriers in frequency domain, thus, 1 RB consists of $N_{symb} \times N_{sc}^{RB}$ Resource Elements (REs), where $N_{symb}$ represents the number of OFDM symbols in a slot; and $N_{sc}^{RB}$ represents the number of continuous subcarriers of the RB in the frequency domain.

Meanwhile, the system also defines the concept of RB group, namely, several continuous RBs are called an RB group; the size of the RB group is determined by a system bandwidth, for example, when the system bandwidth is of less than or equal to 10 RBs, the size of the RB group is 1 RB; when the system bandwidth is of 11 to 26 RBs, the size of the RB group is 2 RBs; when the system bandwidth is of 27 to 63 RBs, the size of the RB group is 3 RBs; and when the system bandwidth is of 64 to 110 RBs, the size of the RB group is 4 RBs.

After a relay technique is introduced to the LTE-A system, as shown in FIG. 1, the link between an eNode-B and a Relay Node (RN) is called a backhaul link or a relay link; the link between the RN and User Equipment (UE) is called an access link; and the link between the eNode-B and the UE is called a direct link.

In the LTE-A system, the R-PDCCH introduced is mainly to solve the problem that the RN cannot receive the Physical Downlink Control Channel (PDCCH) of the eNode-B. At present, the research on multiplexing mode between a control channel and a service channel, after the RN is introduced, is a hot topic, for example, adopting Frequency Division Multiplex (FDM), or FDM+Time Division Multiple (TDM) to perform multiplexing; however, no solution has been provided for the resource allocation of the R-PDCCH.

In the disclosure, the FDM mode refers to that the R-PDCCH and a Relay link-Physical Downlink Shared Channel (R-PDSCH) are transmitted in different PRBs; FDM+TDM mode refers to that the R-PDCCH and the R-PDSCH are transmitted in the same or different PRBs.

When the relay node performs demodulation in the condition of a Demodulation Reference Signal (DMRS), if some relay node has Relay link-Downlink grant (R-DL grant) only, the network side maps the R-DL grant to the first slot, maps or does not map data to the second slot; if some relay node has both R-DL grant and Relay link-Uplink grant (R-UL grant), the network side maps the R-DL grant to the first slot and maps the R-UL grant to the second slot; and if some relay node has R-UL grant only, the network side maps the R-UL grant to the second slot and does not map data to the first slot.

When the relay node performs demodulation in the condition of a Cell-specific Reference Signal (CRS), the network side maps the R-DL grant to the first slot and maps the R-UL grant to the second slot.

Frequency diversity scheduling refers to a scheduling mode or transmission mode capable of acquiring diversity gain in the frequency direction, for example, interleaving control channels of multiple relay nodes together by the network side can be viewed as frequency diversity scheduling.

Frequency selective scheduling refers to a scheduling mode or transmission mode which performs scheduling according to channel quality, for example, scheduling a resource location corresponding to the control channel of some relay node according to channel quality by the network side can be viewed as frequency selective scheduling.

In the disclosure, the RB occupies several subcarriers (for example, 12 subcarriers) in the frequency direction and all OFDM symbols of a slot in the time direction; an RB pair refers to a pair of RBs corresponding to two slots in a subframe; the frequency resource occupies several subcarriers (for example, 12 subcarriers) in the frequency direction, and several OFDM symbols or all OFDM symbols of a slot or subframe in the time direction; and the frequency resource is equivalent to the RB or the RB pair in terms of concept when occupying all the OFDM symbols of a slot or subframe in the time direction. FIG. 2 shows a structural diagram of an existing frame, where snowflake point shade represents a wireless frame; oblique line shade represents a subframe; and blank squares represent OFDM symbols. FIG. 3 shows a diagram of an RB and subcarriers.

SUMMARY

In view of the problems above, the main objective of the disclosure is to provide a method and system for allocating resources of an R-PDCCH, which can implement the resource allocation of the R-PDCCH resources.

In order to achieve the objective above, the technical solution of the disclosure is realized as follows.

The disclosure provides a method for allocating resources of an R-PDCCH, which includes:
configuring a resource allocation way of the R-PDCCH by a network side;
receiving control information carried in the R-PDCCH by a relay node in accordance with the configured resource allocation way.

The resource allocation way may include one or more resource allocation domains configured to carry signalling corresponding to resource allocation;
the resource allocation domain may be configured according to one of or any combination of the following: resource allocation type, demodulation pilot type, grant information type, service channel and control channel multiplexing type and scheduling type.

The resource allocation way may be: adopting a fixed Resource Block (RB), or RB pair, or frequency resource to bear the R-PDCCH.

When configured according to the resource allocation type, the resource configuration way may be a centralized resource allocation domain and/or a distributed resource allocation domain;
when configured according to the demodulation pilot type, the resource configuration way may be a resource allocation domain based on a Demodulation Reference Signal (DMRS) and/or a resource allocation domain based on a Cell-specific Reference Signal (CRS);

when configured according to the grant information type, the resource configuration way may be a resource allocation domain based on Relay link-Downlink grant (R-DL grant) and/or a resource allocation domain based on Relay link-Uplink grant (R-UL grant);

when configured according to the service channel and control channel multiplexing type, the resource configuration way may be a resource allocation domain based on Frequency Division Multiplexing (FDM) and/or a resource allocation domain based on FDM+Time Division Multiplexing (TDM);

when configured according to the scheduling type, the resource configuration way may be a resource allocation domain based on frequency diversity scheduling and/or a resource allocation domain based on frequency selective scheduling.

The resource allocation domain may be carried in broadcast information, or system message, or dedicated information, or Radio Resource Control (RRC) signalling.

the resource allocation way may adopt the same resource allocation way as that of a physical shared channel in a system; or the resource allocation way may adopt a bitmap resource allocation way.

Adopting the same resource allocation way as that of the physical shared channel in the system may include:

the resource allocation way of the R-PDCCH is the same as that of a physical downlink shared channel or physical uplink shared channel of a link between a base station and a terminal; or the resource allocation way of the R-PDCCH is the same as that of a physical downlink shared channel or physical uplink shared channel of a link between a base station and a relay node; or the resource allocation way of the R-PDCCH is the same as that of a physical downlink shared channel or physical uplink shared channel of a link between a relay node and a terminal.

Adopting the bitmap resource allocation way may include: one bit corresponds to one RB or one RB pair or one frequency resource; the bit number of corresponding valid setting information is the number of RBs or RB pairs or frequency resources usable by the R-PDCCH.

The method may further include prior steps of: extracting part of RBs or RB pairs or frequency resources in the entire system bandwidth by the network side;

adopting the same resource allocation way as that of the physical shared channel in the system; or adopting the bitmap resource allocation way.

A method of extracting part of RBs or RB pairs or frequency resources may include:

adopting different extraction ways according to different system bandwidths; or adopting a same extraction way for all system bandwidths.

The extraction way may be explicit or implicit;

when the explicit extraction way is adopted, corresponding extraction information is carried in broadcast information, or system message, or dedicated information, or RRC signalling.

When the resource allocation way includes one or more resource allocation domains, receiving, by the relay node, the control information carried in the R-PDCCH may include:

acquiring, by the relay node, the control information carried in the R-PDCCH from a corresponding RB, or RB pair, or frequency resource in accordance with the configuration of the resource allocation domain;

when the resource allocation way adopts a fixed RB, or RB pair, or frequency resource to bear the R-PDCCH, receiving, by the relay node, the control information carried in the R-PDCCH may include:

acquiring, by the relay node, the control information carried in the R-PDCCH from a promissory fixed RB, or RB pair, or frequency resource.

The disclosure also provides a system for allocating resources of an R-PDCCH, which at least includes a network side and a relay node, wherein the network side is configured to configure a resource allocation way of the R-PDCCH;

the relay node is configured to receive control formation carried in the R-PDCCH in accordance with the configured resource allocation way.

The resource allocation way may include one or more resource allocation domains configured to carry signalling corresponding to resource allocation;

the resource allocation domain may be configured according to one of or any combination of the following: resource allocation type, demodulation pilot type, grant information type, service channel and control channel multiplexing type and scheduling type; or the resource allocation way may adopt a fixed RB, or RB pair, or frequency resource to bear the R-PDCCH.

The network side may be further configured to extract part of RBs or RB pairs or frequency resources in the entire system bandwidth.

The resource allocation way may adopt the same resource allocation way as that of a physical shared channel in a system, or adopts a bitmap resource allocation way.

From the above, it can be seen that the technical solution provided by the disclosure includes: configuring a resource allocation way of the R-PDCCH by a network side; receiving control information carried in the R-PDCCH by a relay node in accordance with the configured resource allocation way. The disclosure provides a specific solution for implementing the resource allocation of the R-PDCCH.

DETAILED DESCRIPTION

Figure 4:
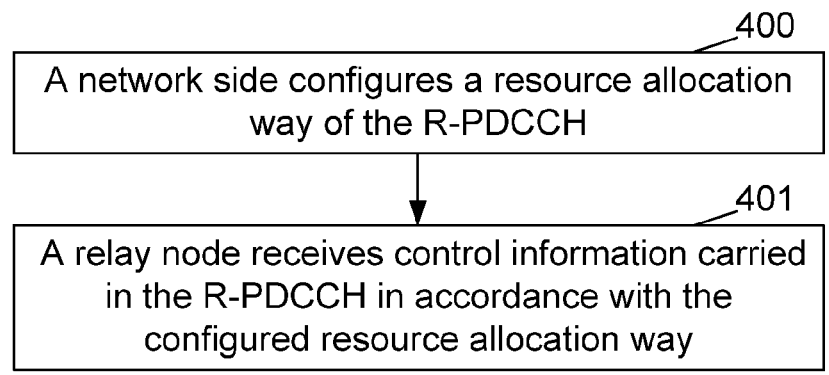
FIG. 4 shows a flowchart of a method for allocating resources of an R-PDCCH.

FIG. 4 shows a flowchart of a method for allocating resources of an R-PDCCH; as shown in FIG. 4, the method includes the following steps.

Step 400: a network side configures a resource allocation way of the R-PDCCH.

In this step, the resource allocation way may include one or more resource allocation domains configured to carry signalling corresponding to resource allocation. Here, the signalling corresponding to resource allocation and the resource allocation domain can be carried in broadcast information, or system message, or dedicated information, or Radio Resource Control (RRC) signalling. In addition, the resource allocation way also can adopt a fixed RB, or RB pair, or frequency resource to bear the R-PDCCH.

The resource allocation domain is configured according to one of or any combination of the following: resource allocation type, demodulation pilot type, grant information type, service channel and control channel multiplexing type and scheduling type, wherein a centralized resource allocation domain and/or a distributed resource allocation domain can be configured, according to the resource allocation type;

a resource allocation domain based on DMRS and/or a resource allocation domain based on CRS can be configured, according to the demodulation pilot type;

a resource allocation domain based on R-DL grant and/or a resource allocation domain based on R-UL grant can be configured, according to the grant information type;

a resource allocation domain based on FDM and/or a resource allocation domain based on FDM+TDM can be configured, according to the service channel and control channel multiplexing type;

a resource allocation domain based on frequency diversity scheduling and/or a resource allocation domain based on frequency selective scheduling can be configured, according to the scheduling type.

In this step, the resource allocation way may adopt the same resource allocation way as that of a physical shared channel in a system, or, adopt a bitmap resource allocation way; wherein adopting the same resource allocation way as that of the physical shared channel in the system may include but not limited to:

the resource allocation way of the R-PDCCH is the same as that of a physical downlink shared channel or physical uplink shared channel of a link between a base station (Node-B) and a terminal; or, the resource allocation way of the R-PDCCH is the same as that of a physical downlink shared channel or physical uplink shared channel of a link between a base station and a relay node; or, the resource allocation way of the R-PDCCH is the same as that of a physical downlink shared channel or physical uplink shared channel of a link between a relay node and a terminal. That is to say, the resource allocation way of the R-PDCCH is the same as that corresponding to any resource allocation domain in downlink control formats transmitted by the PDCCH of the link between the base station and the terminal, or between the base station and the relay node, or between the relay node and the terminal.

Adopting the bitmap resource allocation way includes: one bit corresponds to one RB or one RB pair or one frequency resource. When the bitmap resource allocation way is adopted, the bit number of corresponding valid setting information is the number of RBs or RB pairs or frequency resources usable by the R-PDCCH.

Further, in order to reduce overhead, the resource allocation of the R-PDCCH can be implemented after part of RBs or RB pairs or frequency resources are extracted in the entire system bandwidth; similarly, in this case, the resource allocation way can adopt the same resource allocation way as that of the physical shared channel in the system, or adopt the bitmap resource allocation way.

When part of RBs or RB pairs or frequency resources are extracted, different extraction ways can be adopted according to different system bandwidths, or the same extraction way can be adopted for all system bandwidths, wherein the extraction way can be notified through an explicit or implicit way; when the explicit extraction way is used, the corresponding extraction information can be carried in the broadcast information, or system message, or dedicated information, or RRC signalling; when the implicit extraction way, which is also called a promissory way, is used, it is not necessary to transmit the extraction information.

Step 401: in accordance with the configured resource allocation way, a relay node receives control information carried in the R-PDCCH.

When the resource allocation way includes one or more resource allocation domains, the relay node acquires the control information carried in the R-PDCCH from a corresponding RB, or RB pair, or frequency resource, in accordance with the configuration of the resource allocation domain. When the resource allocation way adopts a fixed RB, or RB pair, or frequency resource to bear the R-PDCCH, the relay node only needs to acquire the control information carried in the R-PDCCH from a promissory fixed RB, or RB pair, or frequency resource.

Figure 1:
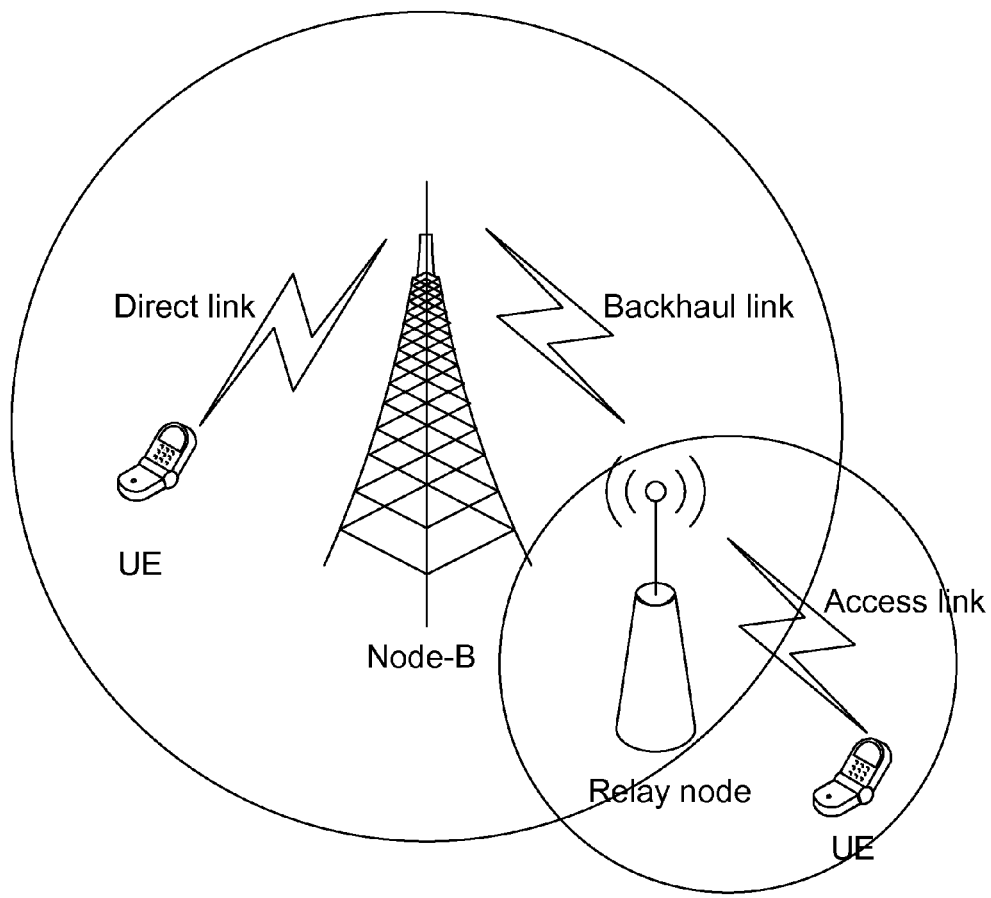
FIG. 1 shows a compositional diagram of an existing LTE-A system.
Figure 2:
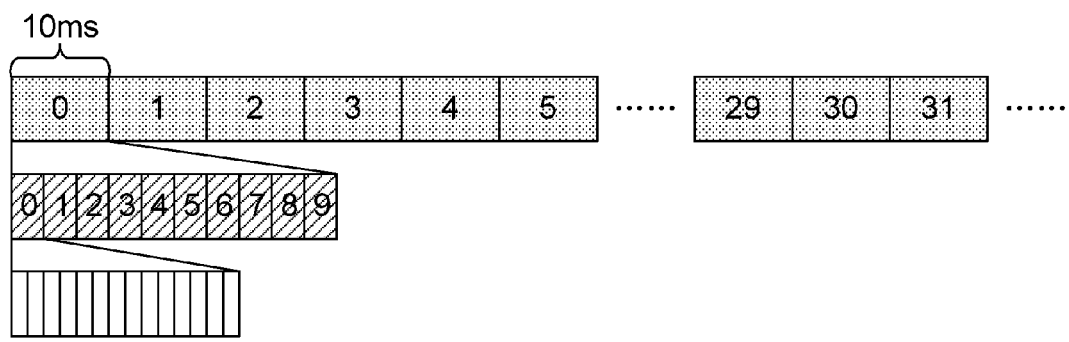
FIG. 2 shows a structural diagram of an existing frame.
Figure 3:
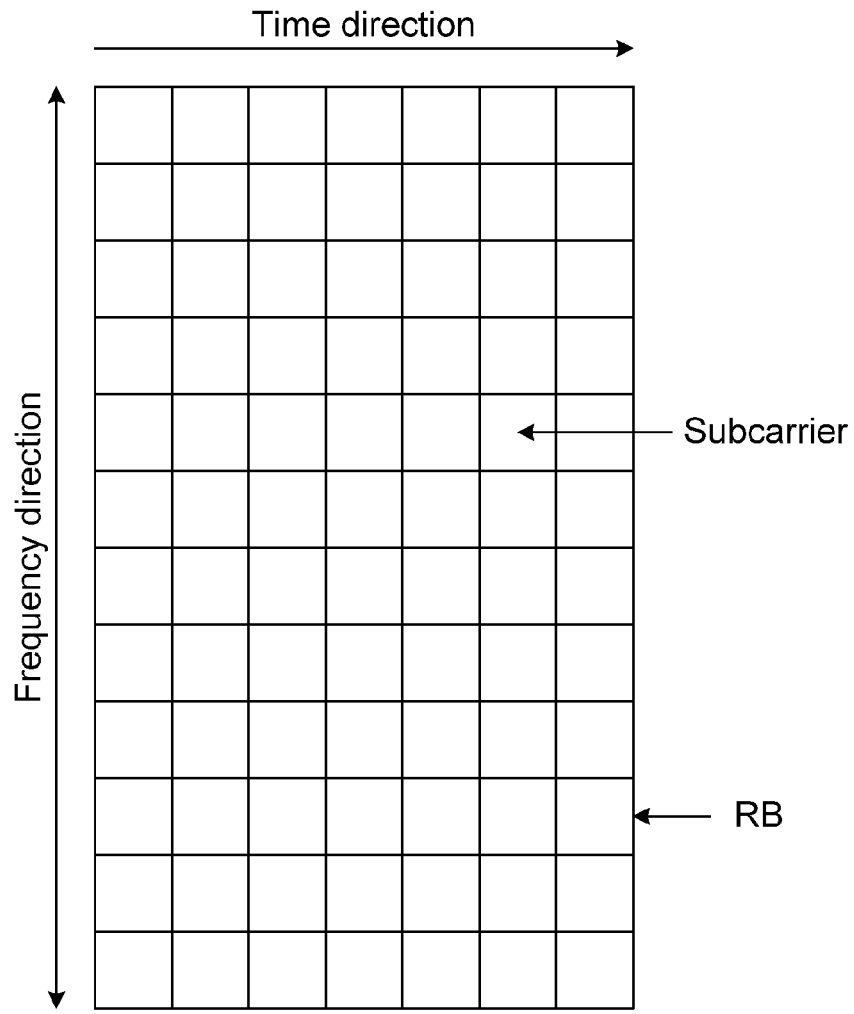
FIG. 3 shows a diagram of an RB and subcarriers.

The disclosure also provides a system for allocating resources of an R-PDCCH, based on the method described above. The system at least includes a network side and a relay node, as shown in FIG. 3, wherein the network side is configured to configure a resource allocation way of the R-PDCCH; wherein the resource allocation way may include one or more resource allocation domains configured to carry signalling corresponding to resource allocation; and the resource allocation domain is configured according to one of or any combination of the following: resource allocation type, demodulation pilot type, grant information type, service channel and control channel multiplexing type and scheduling type;

the relay node is configured to receive control formation carried in the R-PDCCH in accordance with the configured resource allocation way.

Wherein, the resource allocation way may include one or more resource allocation domains configured to carry signalling corresponding to resource allocation. Here, the signalling corresponding to resource allocation can be carried in broadcast information, or system message, or dedicated information, or RRC signalling. In addition, the resource allocation way also can adopt a fixed RB, or RB pair, or frequency resource to bear the R-PDCCH.

The resource allocation way may adopt the same resource allocation way as that of a physical shared channel in the system, or, adopt a bitmap resource allocation way.

The network side is further configured to extract part of RBs or RB pairs or frequency resources in the entire system bandwidth.

A detailed description of the method of the disclosure is given below in conjunction with embodiments.

The First Embodiment

In an LTE system, the downlink control formats transmitted by the PDCCH of the link between the base station and the terminal include resource allocation formats which include: format 0, format 1/1A/1B/1C/1D and format 2/2A; the resource allocation way of the R-PDCCH can use the following resource allocation domains:

Resource Block Assignment and Hopping Resource Allocation in format 0, namely, the resource allocation of uplink is applied to resource allocation of downlink, and original parameters corresponding to the uplink represent parameters corresponding to the downlink;

Resource Allocation Header and Resource Block Assignment in format 1/2/2A;

Localized/Distributed Virtual Resource Block (VRB) Assignment Flag and Resource Block Assignment in format 1A/1B/1D;

Resource Block Assignment in format 1C.

The resource allocation way of the R-PDCCH can adopt the resource allocation way corresponding to any resource allocation domain included in the downlink control formats above.

The Second Embodiment

Supposing that part of RBs or RB pairs or frequency resources are evenly extracted in the entire system bandwidth, the explicit extraction way is adopted, and the corresponding extraction information is carried in broadcast information or system message or dedicated information or RRC signalling. Specific conditions are as shown in Table 1.

TABLE 1

| RB number of system bandwidth | Bit number of extraction information | p conditions for start position | interval size i |
| --- | --- | --- | --- |
| ≤10 | x1 bit | $2^{x1}$ | $i = 2^{x1}$ |
| 11-26 | x2 bit | $2^{x2}$ | $i = 2^{x2}$ |
| 27-63 | x3 bit | $2^{x3}$ | $i = 2^{x3}$ |
| 64-110 | x4 bit | $2^{x4}$ | $i = 2^{x4}$ |

In Table 1, x1, x2, x3 and x4 are any positive integer; when x1, x2, x3 and x4 are different, it means different system bandwidths adopt different intervals of extractions; when x1, x2, x3 and x4 are identical, it means all system bandwidths adopt the same interval of extraction; "$2^x$" means the "x" power of "2".

For example: the system bandwidth is of 50 RBs, and x3=2 is adopted, namely, 2 bits indicates $p=2^{x3}=2^2=4$ conditions for start position respectively; and extraction is performed with interval of $i=2^{x3}=2^2=4$ RBs:

when the 2 bits are "00", it is indicated that the frequency resource corresponding to the RBs with RB sequence numbers of (0 4 8 12 16 20 24 28 32 36 40 44 48) is used to bear the R-PDCCH; in this case, the system bandwidth is equivalent to the frequency resource corresponding to 13 RBs, and the start position is 0 and the interval is 4;

when the 2 bits are "01", it is indicated that the frequency resource corresponding to the RBs with RB sequence numbers of (1 5 9 13 17 21 25 29 33 37 41 45 49) is used to bear the R-PDCCH; in this case, the system bandwidth is equivalent to the frequency resource corresponding to 13 RBs, and the start position is 1 and the interval is 4;

when the 2 bits are "10", it is indicated that the frequency resource corresponding to the RBs with RB sequence numbers of (2 6 10 14 18 22 26 30 34 38 42 46) is used to bear the R-PDCCH; in this case, the system bandwidth is equivalent to the frequency resource corresponding to 12 RBs, and the start position is 2 and the interval is 4;

when the 2 bits are "11", it is indicated that the frequency resource corresponding to the RBs with RB sequence numbers of (3 7 11 15 19 23 27 31 35 39 43 47) is used to bear the R-PDCCH; in this case, the system bandwidth is equivalent to the frequency resource corresponding to 12 RBs, and the start position is 3 and the interval is 4.

For another example: the system bandwidth is of 25 RBs, x2=1 is adopted, namely, 1 bit indicates $p=2^{x2}=2^1.2$ conditions for start position respectively; and extraction is performed with interval of $i=2^{x2}=2^1=2$ RBs:

when the 1 bit is "0", it is indicated that the frequency resource corresponding to the RBs with RB sequence numbers of (0 2 4 6 8 10 12 14 16 18 20 22 24) is used to bear the R-PDCCH; in this case, the system bandwidth is equivalent to the frequency resource corresponding to 13 RBs, and the start position is 0 and the interval is 2;

when the 1 bit is "1", it is indicated that the frequency resource corresponding to the RBs with RB sequence numbers of (1 3 5 7 9 11 13 15 17 19 21 23) is used to bear the R-PDCCH; in this case, the system bandwidth is equivalent to the frequency resource corresponding to 12 RBs, and the start position is 1 and the interval is 2.

Extracted resources are renumbered as m={(n−j)/i|mod(n, i)=j}, where m represents a new frequency resource number; n represents the RB number corresponding to the original system bandwidth; i represents the extraction interval; j represents the start position of extraction; and mod represents a modulus operation. Taking the system bandwidth being of 25 RBs and the 1 bit being "1" for example, in this case, n=(0 1 2 . . . 24), i=2, j=1, then m={(n−1)/2|mod(n,2)=1}=(0 1 2 . . . 11).

The Third Embodiment

Supposing that part of RBs or RB pairs or frequency resources are evenly extracted in the entire system bandwidth, the explicit extraction way is adopted in this case, and the corresponding extraction information is carried in broadcast information or system message or dedicated information or RRC signalling. Specific conditions are as shown in Table 2.

TABLE 2

| RB number of system bandwidth | Bit number of extraction information | p conditions for start position | q conditions for interval size |
| --- | --- | --- | --- |
| ≤10 | x1 + y1 bit | $2^{x1}$ | $2^{y1}$ |
| 11-26 | x2 + y2 bit | $2^{x2}$ | $2^{y2}$ |
| 27-63 | x3 + y3 bit | $2^{x3}$ | $2^{y3}$ |
| 64-110 | x4 + y4 bit | $2^{x4}$ | $2^{y4}$ |

In Table 2, x1, x2, x3, x4, y1, y2, y3, and y4 are any positive integer; "$2^x$" means the "x" power of "2"; "$2^y$" means the "y" power of "2". Preferably, $x=y=\lceil \log_2(N_{RB}) \rceil$, or $x+y=\lceil \log_2 N_{RB}(N_{RB}+1)/2 \rceil$, where $N_{RB}$ represents the number of RBs corresponding to the system bandwidth.

For example: the system bandwidth is of 50 RBs, and x3=2 is adopted, namely, 2 bits indicates $p=2^{x3}=2^2=4$ conditions for start position respectively; y3=2 is adopted, namely, 2 bits indicates that extraction is performed with $q=2^{y3}=2^2=4$ conditions of intervals of RBs respectively:

when the 2 bits x3 is "00" and the 2 bits y3 is "00", it is indicated that the frequency resource corresponding to the RBs with RB sequence numbers of (0 1 2 3 4 5 6 7 8 9 10 11 12) is used to bear the R-PDCCH; in this case, the system bandwidth is equivalent to the frequency resource corresponding to 13 RBs, and the start position is 0 and the interval is 1;

when the 2 bits x3 is "11" and the 2 bits y3 is "11", it is indicated that the frequency resource corresponding to the RBs with RB sequence numbers of (3 7 11 15 19 23 27 31 35 39 43 47) is used to bear the R-PDCCH; in this case, the system bandwidth is equivalent to the frequency resource corresponding to 12 RBs, and the start position is 3 and the interval is 4.

Bit combination indicates different start positions and different intervals; and no further example is illustrated here, because it is easy for those skilled in the art to obtain other examples according to the description above.

Extracted resources are renumbered as m={(n−j)/i|mod(n, i)=j}, where m represents a new frequency resource number;

n represents the RB number corresponding to the original system bandwidth; i represents the extraction interval; j represents the start position of extraction; and mod represents a modulus operation. Taking the system bandwidth being of 50 RBs and the 2 bits both being "11" for example, in this case, n=(0 1 2 ... 49), i=4, j=3, then m={(n−3)/4|mod(n,4)=3}=(0 1 2 ... 11)

The Fourth Embodiment

Supposing that part of RBs or RB pairs or frequency resources are evenly extracted in the entire system bandwidth, the implicit extraction way is adopted in this case, and there is no corresponding extraction information. Specific conditions are as shown in Table 3.

TABLE 3

| RB number of system bandwidth | Bit number of extraction information | Start position j | interval size i |
|---|---|---|---|
| ≤10 | 0 bit | Fixed | i = i1 |
| 11-26 | 0 bit | Fixed | i = i2 |
| 27-63 | 0 bit | Fixed | i = i3 |
| 64-110 | 0 bit | Fixed | i = i4 |

In Table 3, the fixed start positions of different system bandwidths can be the same or different; in this embodiment, take the start position being fixed at 0 for example; i1, i2, i3 and i4 are any positive integer; when i1, i2, i3 and i4 are different, it means different system bandwidths adopt different intervals of extractions; when i1, i2, i3 and i4 are identical, it means all system bandwidths adopt the same interval of extraction.

Supposing different system bandwidths adopt different extractions, for example: when the system bandwidth is of 75 RBs, extraction is performed with the start position of 0 and the interval of i4=4 RBs, the frequency resource corresponding to the RBs with RB sequence numbers of (0 4 8 12 16 20 24 28 32 36 40 44 48 52 56 60 64 68 72) is used to bear the R-PDCCH; in this case, the system bandwidth is equivalent to the frequency resource corresponding to 19 RBs, and the start position is 0 and the interval is 4;

for another example: when the system bandwidth is of 15 RBs, extraction is performed with the start position of 0 and the interval of i2=2 RBs, the frequency resource corresponding to the RBs with RB sequence numbers of (0 2 4 6 8 10 12 14) is used to bear the R-PDCCH; in this case, the system bandwidth is equivalent to the frequency resource corresponding to 8 RBs, and the start position is 0 and the interval is 2.

Extracted resources are renumbered as m={n/i|mod(n,i)=0}, where m represents a new frequency resource number; n represents the RB number corresponding to the original system bandwidth; i represents the extraction interval; and mod represents a modulus operation. Taking the system bandwidth being of 75 RBs for example, in this case, n=(0 1 2 ... 74), i=4, then m={n/4|mod(n,4)=0}=(0 1 2 ... 18)

Supposing all system bandwidths adopt the same extraction, for example: when the system bandwidth is of 100, 75, 50, 25, 15 and 6 RBs, extraction is performed with the same interval of RBs.

Extracted resources are renumbered as m={n/i|mod(n,i)=0}, where m represents a new frequency resource number; n represents the RB number corresponding to the original system bandwidth; i represents the extraction interval; and mod represents a modulus operation. Taking the system bandwidth being of 15 RBs for example, in this case, n=(0 1 2 ... 14), i=3, then m={n/3|mod(n,3)=0}=(0 1 2 ... 4).

The Fifth Embodiment

Supposing that part of RBs or RB pairs or frequency resources are evenly extracted in the entire system bandwidth; the extraction also can be performed based on RB group; extracted resources are renumbered as m'={n'|mod(n', i')=j'}, where m' represents the corresponding RB group number meeting conditions; n' represents the RB group number corresponding to the original system bandwidth; i' represents extraction interval of the RB group; j' represents the start position of RB group extraction; and mod represents a modulus operation. Taking the system bandwidth being of 50 RBs for example, the size of the RB group is 3 RBs, n'=(0 1 2 ... 16), i'=4, j'=0, then m'=(0 4 8 12 16). In this case, the number of extracted frequency resources is 14, and the new numbers are (0 1 2 ... 13).

The Sixth Embodiment

Figure 5:
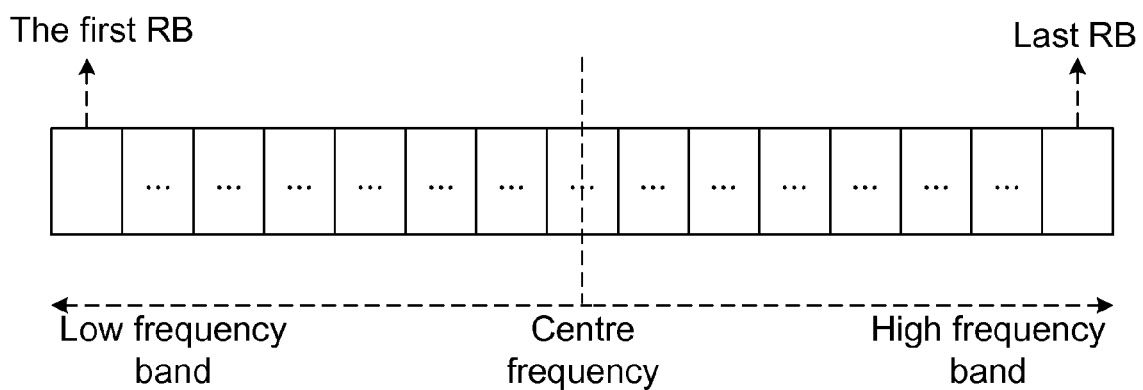
FIG. 5 shows a diagram of a system bandwidth according to an embodiment of the disclosure.

FIG. 5 shows a diagram of a system bandwidth according to an embodiment of the disclosure. As shown in FIG. 5, " ... " represents a plurality of RBs, supposing that part of RBs or RB pairs or frequency resources are continuously extracted in the entire system bandwidth. When extraction is performed based on a fixed length, supposing that frequency resources of ¼ system bandwidth with a centre frequency as center of symmetry are extracted to bear the R-PDCCH, for example, the system bandwidth is of 50 RBs, then total 12 RBs including 6 RBs on the right side and 6 RBs on the left side with the centre frequency as the center of symmetry, are numbered to bear the R-PDCCH, then the new numbers are (0 1 2 ... 11);

when extraction is performed based on a variable length, the bit length of the extraction information is preferably $\lceil \log_2(N_{RB}) \rceil$, for example, the system bandwidth is of 50 RBs, then the extraction information is of 7 bits; supposing that the 7 bits are "0000100", then it is indicated that total 4 RBs including 2 RBs on the right side and 2 RBs on the left side with the centre frequency as the center of symmetry, are numbered to bear the R-PDCCH, and the new numbers are (0 1 2 3); this method is equivalent to notifying to reserve the number of RBs available.

Supposing that part of RBs or RB pairs or frequency resources are continuously extracted in the entire system bandwidth, when extraction is performed based on a fixed length, supposing that frequency resources of ¼ system bandwidth on low frequency band are extracted to bear the R-PDCCH, for example: the system bandwidth is of 50 RBs, then starting from the first RB to high frequency band, total 12 RBs are extracted and numbered to bear the R-PDCCH, then the new numbers are (0 1 2 ... 11);

when extraction is performed based on a variable length, the bit length of the) extraction information is preferably $\lceil \log_2(N_{RB}) \rceil$, for example, the system bandwidth is of 50 RBs, then the extraction information is of 7 bits; supposing that the 7 bits are "0000101", starting from the first RB to high frequency band, total 5 RBs are extracted and numbered to bear the R-PDCCH, then the new numbers are (0 1 2 3 4); this method is equivalent to notifying to reserve the number of RBs available.

Supposing that part of RBs or RB pairs or frequency resources are continuously extracted in the entire system bandwidth, when extraction is performed based on a fixed length, supposing that frequency resources of ¼ system bandwidth on high frequency band are extracted to bear the R-PDCCH;

for example: the system bandwidth is of 50 RBs, then starting from the last RB to low frequency band, total 12 RBs are extracted and numbered to bear the R-PDCCH, then the new numbers are (0 1 2 . . . 11); when extraction is performed based on a variable length, the bit length of the extraction information is preferably $\lceil \log_2(N_{RB}) \rceil$.

for another example: the system bandwidth is of 50 RBs, then the extraction information is of 7 bits; supposing that the 7 bits are "0000011", starting from the last RB to low frequency band, total 3 RBs are extracted and numbered to bear the R-PDCCH, then the new numbers are (0 1 2); this method is equivalent to notifying to reserve the number of RBs available.

Supposing that part of RBs or RB pairs or frequency resources are continuously extracted in the entire system bandwidth, when extraction is performed based on a fixed length, supposing that frequency resources of ¼ system bandwidth are extracted to bear the R-PDCCH, for example, the system bandwidth is of 50 RBs, then starting from the first RB to high frequency band and from the last RB to low frequency band, total 12 RBs are extracted and numbered to bear the R-PDCCH, then the new numbers are (0 1 2 . . . 11);

when extraction is performed based on a variable length, the bit length of the extraction information is preferably $\lceil \log_2(N_{RB}) \rceil$, for example, the system bandwidth is of 50 RBs, then the extraction information is of 7 bits; supposing the 7 bits are "0001000", starting from the first RB to the high frequency band and from the last RB to the low frequency band, total 8 RBs are extracted and numbered to bear the R-PDCCH, namely, 4 RBs on low frequency band and 4 RBs on high frequency band (on two ends of frequency band of the system bandwidth), then the new numbers are (0 1 2 3 4 5 6 7); this method is equivalent to notifying to reserve the number of RBs available.

The Seventh Embodiment

When the problem of overhead is left out and extraction is not performed, the number of available RBs or RB pairs or frequency resources is the same as that of RBs corresponding to the system bandwidth, and it is not necessary to renumber RBs; in this case, the corresponding resource allocation way is the same as that corresponding to the shared channel in the LTE system, or adopts the bitmap resource allocation way.

When the same resource allocation way as that corresponding to the shared channel in the LTE system is adopted, the resource allocation way corresponding to the resource allocation domain in the first embodiment can be adopted;

when the bitmap resource allocation way, namely, one bit corresponding to one frequency resource, is adopted, as described in the second embodiment, supposing the that system bandwidth is of 25 RBs, n=(0 1 2 . . . 24), then 25 bits are needed totally, for example, "0101000000010000000000001" indicates that the $2^{nd}$, $4^{th}$, $12^{th}$, and $25^{th}$ frequency resources are used to bear the R-PDCCH.

The Eighth Embodiment

After the RBs or RB pairs or frequency resources are extracted according to the second to seventh embodiments and are renumbered, the corresponding resource allocation way can be the same as that corresponding to the shared channel in the LET system, or can adopt the bitmap resource allocation way.

When the same resource allocation way as that corresponding to the shared channel in the LTE system is adopted, the resource allocation way corresponding to the resource allocation domain in the first embodiment can be adopted;

when the bitmap resource allocation way, namely, one bit corresponding to one frequency resource, is adopted, as described in the second embodiment, the system bandwidth is of 25 RBs, n=(0 1 2 . . . 24), extraction is performed according to the second embodiment, then i=2, j=1, m={(n−1)/2|mod (n,2)=1}=(0 1 2 . . . 11), and then 12 bits are needed totally, for example, "101100001101" indicates that the $1^{st}$, $3^{rd}$, $4^{th}$, $9^{th}$, $10^{th}$ and $12^{th}$ frequency resources which are renumbered are used to bear the R-PDCCH.

The Ninth Embodiment

The signaling corresponding to the resource allocation of the R-PDCCH can be carried in broadcast information, or system message, or dedicated information or RRC signaling. When the corresponding signaling includes a plurality of resource allocation domains, for example, the network side configures the resource allocation domain of the R-PDCCH which is demodulated using a DMRS (marked by Domain A), and the network side configures the resource allocation domain of the R-PDCCH which is demodulated using a CRS (marked by Domain B).

If the relay node demodulates the R-PDCCH using a DMRS, specific RBs or RB pairs or frequency resources corresponding to the R-PDCCH are acquired according to the resource allocation signaling of the Domain A; if the relay node demodulates the R-PDCCH using a CRS, specific RBs or RB pairs or frequency resources corresponding to the R-PDCCH are acquired according to the resource allocation signaling of the Domain B.

The resource allocation domains shown by the Domain A and the Domain B can adopt the resource allocation domain way described in the first to eighth embodiments, and no further description is repeated here.

The Tenth Embodiment

The signaling corresponding to the resource allocation of the R-PDCCH can be carried in broadcast information, or system message, or dedicated information or RRC signaling. When the corresponding signaling includes a plurality of resource allocation domains, for example, the network side configures the R-PDCCH which is demodulated using a DMRS and the control channel contains the resource allocation domain of R-DL grant only or contains the resource allocation domain of R-DL grant and R-UL grant (marked by Domain C); the network side configures the R-PDCCH which is demodulated using a DMRS and the control channel contains the resource allocation domain of R-UL grant only (marked by Domain D); the network side configures the R-PDCCH which is demodulated using a CRS and the control channel contains the resource allocation domain of R-DL grant only (marked by Domain E); and the network side configures the R-PDCCH which is demodulated using a CRS and the control channel contains the resource allocation domain of R-UL grant only (marked by Domain F).

If the relay node demodulates the R-PDCCH using a DMRS, specific RBs or RB pairs or frequency resources corresponding to the R-PDCCH are acquired according to the resource allocation signaling of the Domain C and/or the Domain D; if the relay node demodulates the R-PDCCH using a CRS, specific RBs or RB pairs or frequency resources corresponding to the R-PDCCH are acquired according to the resource allocation signaling of the Domain E and/or the Domain F.

The resource allocation domains shown by the Domain C, the Domain D, the Domain E and the Domain F can adopt the resource allocation domain ways described in the first to eighth embodiments, and no further description is respected here.

The Eleventh Embodiment

The extraction information or the signaling corresponding to resource allocation can be carried in broadcast information, or system message, or dedicated information, or RRC signaling;

when the way of broadcast information is adopted, preferably, the extraction information or the signaling corresponding to resource allocation can be carried in a Relay link-Physical Broadcast Channel (R-PBCH) or the Physical Broadcast Channel (PBCH) in the LTE/LTE-A system;

when the way of the system message is adopted, preferably, the extraction information or the signaling corresponding to resource allocation can be carried in a Relay link-System Information Block (R-SIB) or the System Information Block (SIB) in the LTE/LTE-A system, without limiting specific SIB index (for example, not limiting specific SIB1, SIB2, SIB3, . . . );

when the way of dedicated information is adopted, preferably, the extraction information or the signaling corresponding to resource allocation can be carried in the dedicated channel resource or dedicated physical resource, wherein the channel resource or the physical resource can be of point-to-point or point-to-multipoint (point-to-point refers that the network side configures information or signaling for one relay node, and point-to-multipoint refers that the network side configures information or signaling for multiple relay nodes);

when the way of RRC signaling is adopted, preferably, the extraction information or the signaling corresponding to resource allocation can be carried in the RRC signaling in the LTE/LTE-A system or the RRC signaling dedicated to the relay-link, wherein the RRC signaling can be of point-to-point or point-to-multipoint.

The Twelfth Embodiment

For a relay node which initially accesses the network, the network side also can adopt a fixed RB or RB pair or frequency resource to bear the R-PDCCH, besides adopting the above methods to acquire the resource allocation signaling of the R-PDCCH.

Preferably, positions of corresponding RBs or RB pairs or frequency resources used to bear the R-PDCCH are calculated according to a Relay Node_Radio Network Temporary Identifier (RN_RNTI) or Relay Node_Physical Cell Identify (RN_PCID);

for example, modulus operation is performed on RN_RNTI and the RB corresponding to the system bandwidth, supposing that the RN_RNTI is a 16-bit binary "0000000000001000", the corresponding decimal is "8", the RB corresponding to the system bandwidth is "50", then the position of the RB or RB pair or frequency corresponding to the R-PDCCH is mod(8, 50), that is, the $8^{th}$ RB or RB pair or frequency resource, or several RBs or RB pairs or frequency resources behind the $8^{th}$ RB or RB pair or frequency resource are used to bear the R-PDCCH.

The above are only the preferred embodiments of the disclosure and not intended to limit the scope of protection of the disclosure. Any modifications, equivalent substitutions and improvements made within the spirit and principle of the disclosure are deemed to be included within the scope of protection of the disclosure.

The invention claimed is:

1. A method for allocating resources of a Relay link-Physical Downlink Control Channel (R-PDCCH), comprising:
   configuring a resource allocation way of the R-PDCCH by a network side;
   receiving control information carried in the R-PDCCH by a relay node in accordance with the configured resource allocation way;
   wherein the resource allocation way comprises one or more resource allocation domains configured to carry signalling corresponding to resource allocation;
   the resource allocation domain is configured according to one of or any combination of the following: resource allocation type, demodulation pilot type, grant information type, service channel and control channel multiplexing type and scheduling type;
   wherein when configured according to the resource allocation type, the resource configuration way is a centralized resource allocation domain and/or a distributed resource allocation domain;
   when configured according to the demodulation pilot type, the resource configuration way is a resource allocation domain based on a Demodulation Reference Signal (DMRS) and/or a resource allocation domain based on a Cell-specific Reference Signal (CRS);
   when configured according to the grant information type, the resource configuration way is a resource allocation domain based on Relay link-Downlink grant (R-DL grant) and/or a resource allocation domain based on Relay link-Uplink grant (R-UL grant);
   when configured according to the service channel and control channel multiplexing type, the resource configuration way is a resource allocation domain based on Frequency Division Multiplexing (FDM) and/or a resource allocation domain based on FDM+Time Division Multiplexing (TDM);
   when configured according to the scheduling type, the resource configuration way is a resource allocation domain based on frequency diversity scheduling and/or a resource allocation domain based on frequency selective scheduling.

2. The method according to claim 1, wherein the resource allocation way is: adopting a fixed Resource Block (RB), or RB pair, or frequency resource to bear the R-PDCCH.

3. The method according to claim 1, wherein the resource allocation domain is carried in broadcast information, or system message, or dedicated information, or Radio Resource Control (RRC) signalling.

4. The method according to claim 1, wherein the resource allocation way adopts the same resource allocation way as that of a physical shared channel in a system; or
   the resource allocation way adopts a bitmap resource allocation way,
   wherein adopting the same resource allocation way as that of the physical shared channel in the system comprises:
   the resource allocation way of the R-PDCCH is the same as that of a physical downlink shared channel or physical uplink shared channel of a link between a base station and a terminal; or the resource allocation way of the R-PDCCH is the same as that of a physical downlink shared channel or physical uplink shared channel of a link between a base station and a relay node; or the resource allocation way of the R-PDCCH is the same as that of a physical downlink shared channel or physical uplink shared channel of a link between a relay node and a terminal, wherein adopting the bitmap resource allocation way comprises: one bit corresponds to one RB or one RB pair or one frequency resource; the bit number of corresponding valid setting information is the number of RBs or RB pairs or frequency resources usable by the R-PDCCH.

5. The method according to claim 1, further comprising prior steps of: extracting part of RBs or RB pairs or frequency resources in the entire system bandwidth by the network side;

adopting the same resource allocation way as that of the physical shared channel in the system; or adopting the bitmap resource allocation way, wherein a method of extracting part of RBs or RB pairs or frequency resources comprises:

adopting different extraction ways according to different system bandwidths; or adopting a same extraction way for all system bandwidths, wherein the extraction way is explicit or implicit;

when the explicit extraction way is adopted, corresponding extraction information is carried in broadcast information, or system message, or dedicated information, or RRC signalling.

6. The method according to claim 1, wherein when the resource allocation way comprises one or more resource allocation domains, receiving, by the relay node, the control information carried in the R-PDCCH comprises:

acquiring, by the relay node, the control information carried in the R-PDCCH from a corresponding RB, or RB pair, or frequency resource in accordance with the configuration of the resource allocation domain;

when the resource allocation way adopts a fixed RB, or RB pair, or frequency resource to bear the R-PDCCH, receiving, by the relay node, the control information carried in the R-PDCCH comprises:

acquiring, by the relay node, the control information carried in the R-PDCCH from a promissory fixed RB, or RB pair, or frequency resource.

7. A system for allocating resources of a Relay link-Physical Downlink Control Channel (R-PDCCH), at least comprising a network side and a relay node, wherein the network side is configured to configure a resource allocation way of the R-PDCCH;

the relay node is configured to receive control formation carried in the R-PDCCH in accordance with the configured resource allocation way;

wherein the resource allocation way comprises one or more resource allocation domains configured to carry signalling corresponding to resource allocation;

the resource allocation domain is configured according to one of or any combination of the following: resource allocation type, demodulation pilot type, grant information type, service channel and control channel multiplexing type and scheduling type;

wherein when configured according to the resource allocation type, the resource configuration way is a centralized resource allocation domain and/or a distributed resource allocation domain;

when configured according to the demodulation pilot type, the resource configuration way is a resource allocation domain based on a Demodulation Reference Signal (DMRS) and/or a resource allocation domain based on a Cell-specific Reference Signal (CRS);

when configured according to the grant information type, the resource configuration way is a resource allocation domain based on Relay link-Downlink grant (R-DL grant) and/or a resource allocation domain based on Relay link-Uplink grant (R-UL grant);

when configured according to the service channel and control channel multiplexing type, the resource configuration way is a resource allocation domain based on Frequency Division Multiplexing (FDM) and/or a resource allocation domain based on FDM+Time Division Multiplexing (TDM);

when configured according to the scheduling type, the resource configuration way is a resource allocation domain based on frequency diversity scheduling and/or a resource allocation domain based on frequency selective scheduling.

8. The system according to claim 7, wherein the resource allocation way adopts a fixed RB, or RB pair, or frequency resource to bear the R-PDCCH.

* * * * *